United States Patent
Stevenson

[15] 3,682,312
[45] Aug. 8, 1972

[54] CONTINUOUS ION EXCHANGE APPARATUS AND METHOD OF OPERATING THE SAME

[72] Inventor: David Gordon Stevenson, London, England

[73] Assignee: Paterson Candy International Limited, London, England

[22] Filed: June 5, 1970

[21] Appl. No.: 43,796

[30] Foreign Application Priority Data
June 9, 1969 Great Britain..........28,992/69

[52] U.S. Cl....................................210/189, 210/268
[51] Int. Cl. .............................................B01d 23/10
[58] Field of Search....................210/19, 33, 189, 268

[56] References Cited
UNITED STATES PATENTS 2,870,088  1/1959  Bergstrom................210/33 X
2,963,431  12/1960  Dorn et al..............210/268 X

*Primary Examiner*—Frank A. Spear, Jr.
*Attorney*—Craig, Antonelli, Stewart & Hill

[57] ABSTRACT

A continuous ion-exchange apparatus having a multi-stage open ion-exchange column and a multi-stage closed regenerator column in which the mixed resins from the lower part of the ion exchange column are withdrawn by means of a pipe and are conveyed to an air cavity at the top of the regenerator column while there is a pipe connecting the bottom of the regenerator column to a point above the level of the surface of the liquid in the ion-exchange column and the resins are induced to flow by alternately supplying a sub-atmospheric pressure or a super-atmospheric pressure at the cavity at the top of the regenerator column by the alternative operation of valves controlling the sub- and super-atmospheric pressures.

12 Claims, 4 Drawing Figures

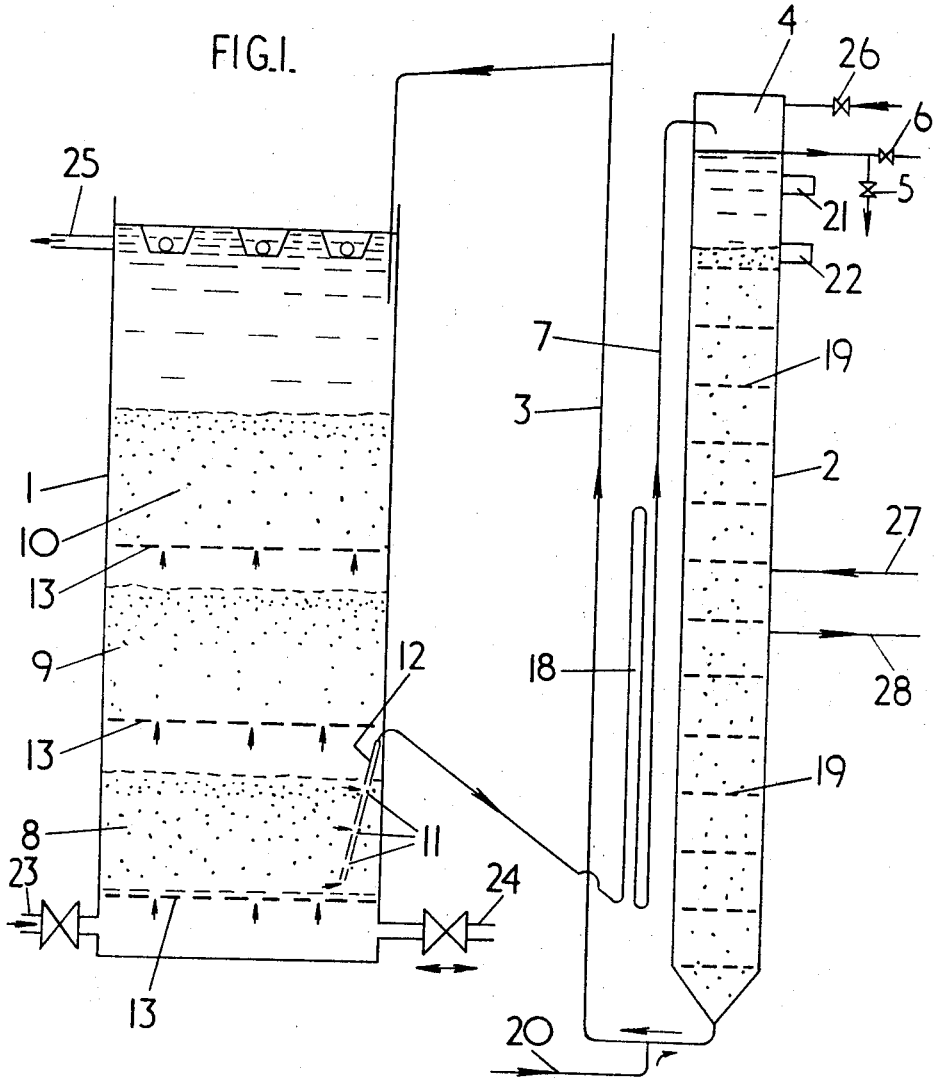
FIG.I.

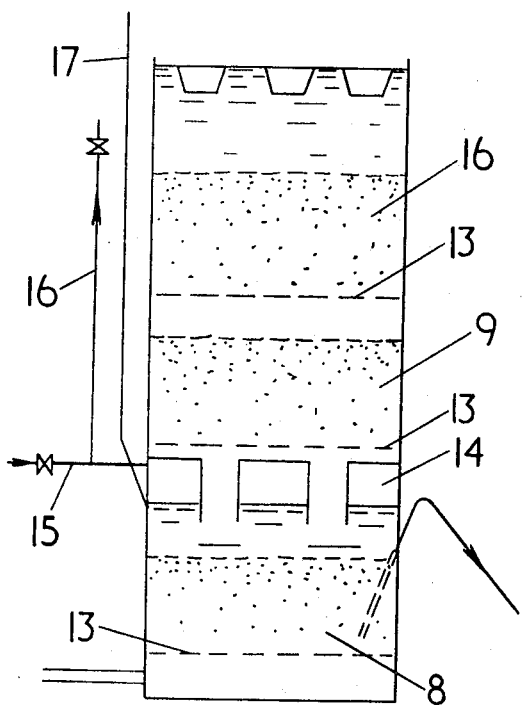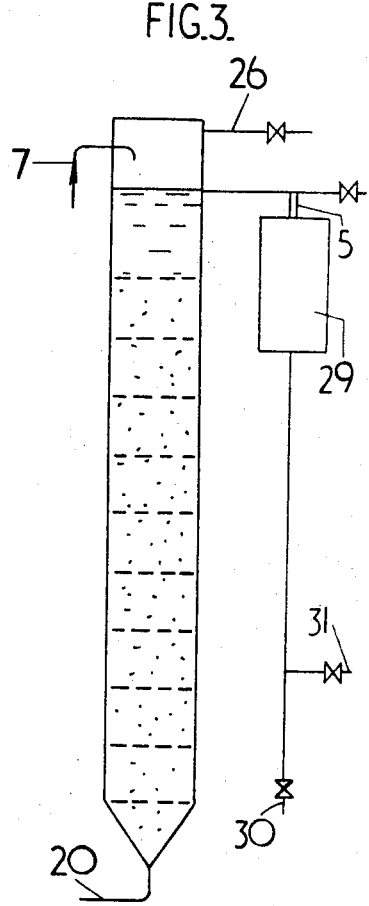

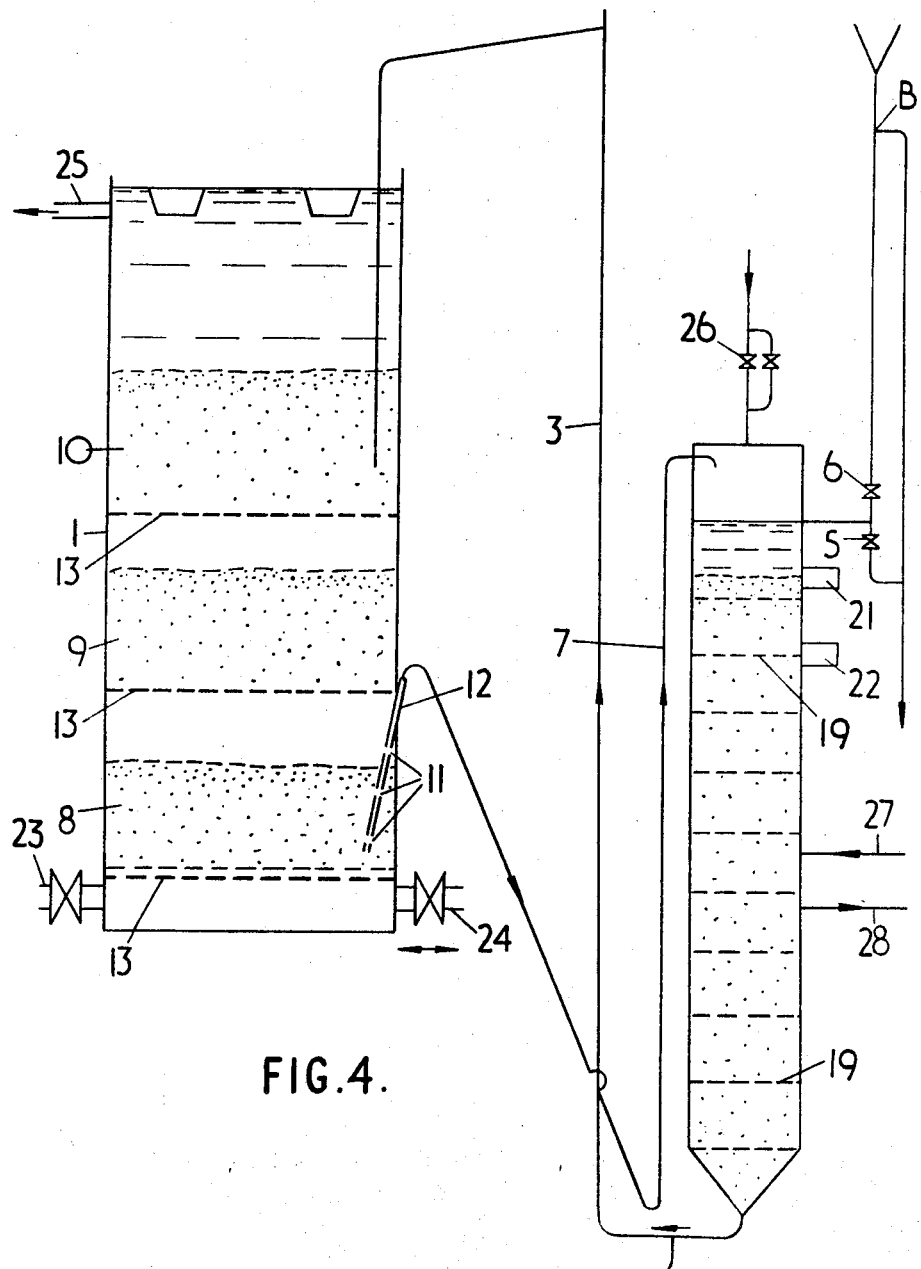

CONTINUOUS ION EXCHANGE APPARATUS AND METHOD OF OPERATING THE SAME

The invention relates to continuous ion exchange apparatus and method of operating the same.

In continuous ion exchange processes the ion exchange resin is transferred in a closed loop between absorption and regeneration stages, in contrast to fixed bed processes, where the resin remains in the same vessel. Ion exchange resin particles may be conveyed readily as a suspension in water, but are relatively fragile and cannot pass through pumps without sustaining damage.

In order to convey resin from the absorber to the regenerator and vice versa, valves are commonly used so that flow may proceed in the desired direction. However, unless specially designed valves are employed, part of the resin is crushed during valve operation. It is possible to flush the valves with water to ensure that the valve seat closes on water only, but this adds to the complexity of the system as well as introducing unwanted water.

One known method proposed to eliminate the valves, is the use of ejectors. However, these tend to cause abrasion of the resin, since high velocity water jets entrain the particles and cause them to abrade on each other and on the pipe walls.

A further method commonly used to convey suspension of solids in water is an air lift, but this, however, is not satisfactory at large flow rates, nor when the pressure difference to them overcome is a significant proportion of the hydrostatic head in the air lift tube.

The invention consists in continuous ion exchange apparatus characterized in comprising a multi-stage open ion-exchange column and a multi-stage closed regenerator column, means for withdrawing mixed resins from the lower part of the ion exchange column, a pipe connecting the means for withdrawing the mixed resins to an air cavity at the top of the regenerator column, said pipe connection including sufficient vertical components as to resist the back flow of liquid under the influence of air pressure at the top of the regenerator column, a pipe connecting the bottom of the regenerator column to a point above the level of the surface of the liquid in the ion exchange column, means for producing a sub-atmospheric pressure of air in the cavity at the top of the regenerator column, a valve to control the said sub-atmospheric pressure in the cavity, means for providing a super-atmospheric pressure of air in the cavity at the top of the generator column and a valve for controlling the super-atmospheric pressure of air in the cavity.

The invention further consists in a continuous ion exchange apparatus being a modification of the apparatus as set forth in the preceding paragraph in which the regenerator column is at a lower level than the ion exchange column, and the resins flow by gravity from the latter to the former, thus eliminating the necessity for means for producing a sub-atmospheric pressure, whilst retaining the super-atmospheric pressure for transferring the resins in the reverse direction.

The object of the invention is to overcome the disadvantages above referred to.

The accompanying drawings show, by way of example only, one embodiment of the invention with modifications thereto, in which FIG. 1 is a diagrammatic representation of a continuous ion exchange apparatus constructed in accordance with the invention.

FIG. 2 shows diagrammatically a modification of the absorber column of FIG. 1,

FIG. 3 shows diagrammatically a further modification of the regenerator column of FIG. 1, while FIG. 4 shows diagrammatically a modification of the apparatus of FIG. 1.

In one form of construction in accordance with the invention, as shown in FIG. 1, the continuous ion exchange system comprises an absorber column 1, and a regenerator column 2, in which the resin flows intermittently or continuously downwards, and is elevated by way of the pipe 3 from the bottom of the regenerator column 2 to the top of the absorber column 1. It is arranged that the operation of the transfer process does not interfere with the absorption process. It is also arranged that the method of transfer does not cause segregation of the different sizes of particles of the resin, nor transfer only one fraction.

In order to cause transfer of the resin from the absorber 1 to the regenerator 2, air is removed from the space 4 by the suction pipe 5, surplus liquid being removed via suction pipe 5 (for example by means of an ejector). Valve 6 is closed at this point. In normal conditions valves 5 and 26 are closed, while valve 6 is open. This reduction in pressure in the space 4 draws liquid from the lowest section of the regenerator 1 by means of the pipe 7, which allows at its upper end a small free fall, so that back syphoning cannot occur when the space 4 is vented. It is desirable that the rising sections of the pipes 3 and 7 be vertical, in order to minimize back settling of the resin in the slurry.

The resin is drawn from the fluidized lower bed 8 of the beds 8, 9 and 10, of the absorber column 1, in which in each bed coarse particles remain near the bottom and fine particles near the top. For this reason, two or more inlet holes 11 are provided at different levels in the dip pipe 12, so that a uniform mixed sample of the sizes is withdrawn.

In one method of transferring resin from stage to stage in the absorber column 1 involves reversing the flow through the distributor plates 13, there is a point in the cycle at which the lower bed 8 is not fluidized. It may be arranged for an interlocking of the controls to be provided to prevent transfer to the regenerator column 2 coinciding with stage transfer in the absorber.

A method of avoiding this difficulty is to reverse the flow through the upper stage or stages only by providing an internal air chamber 14, see FIG. 2, which will absorb the forward and reverse flows for the few seconds required for transfer. During this process a continuous supply of air under pressure is provided by the pipe 15, with a dump vent 16. Air is released by way of the pipe 17.

Seeing that normally the absorber 1 is a large open vessel, while the regenerator 2 is much smaller, it is more convenient to effect transfer by pressurizing the top of the regenerator, and forcing resin downwards and from the bottom up a resin tube to the absorber, via an air break to prevent syphoning. The rising tube is preferably of reasonably small bore, so that, when suction is applied to the regenerator, the reverse flow caused by lowering the liquid level provides little movement in the column.

It is a feature of the invention that the suction or pressure required to cause resin flow is less than the hydrostatic head produced in the columns or in the associated pipe work. If the pressure or suction exceeds the head of a single column the transfer tube may be extended to form one or more invert traps 18 as illustrated in FIG. 1. In this way, any required pressure or suction can be contained without air bubbling into the columns, or in the use of the non-return valves.

The regenerator in many cases operates with a non- or marginally fluidized bed. It is possible for resin segregation to occur. To prevent preferential transfer of the coarse fraction the volume transferred at each cycle equals the volume contained in one "stage" defined by the perforated distributor plates 19. These permit resin to pass while creating a finite pressure drop.

The perforated plates allow one to obtain uniform flow during transfer of a packed bed, preventing any rat-holing or differential flow, while at the same time preventing mixing of the resin in a vertical direction during the upward flow period. The perforation may for example comprise inch inch drain holes at a hexagonal pitch of 1½ inches, covered with tunnels.

A further feature is the use of an unsmoothed flow of wash water via the pipe 20 to the bottom of the rising pipe from the regenerator. Wash water is required at this point, but the use of a pulsating flow prevents blockage of the resin in the rising pipe.

Compressed air at low pressure may be used for the return transfer, and be controlled by photocells 21 and 22 or some other detecting device.

Pipe 23 supplies raw water to the absorber and pipe 24 is connected to a reversal flow tank, while soft water flows out of the top of the absorber column by the pipe 25.

Transfer air is fed to the space 4 by the pipe 26, brine is fed to the regenerator by the pipe 27, while make-up water flows by the pipe 28.

Suction may be provided by a centifugal or vacuum pump as desired, either being capable of dealing with an air/water mixture, or be provided with an interceptor chamber.

Alternatively, a syphon may be employed as shown in FIG. 3 in which the suction pipe 5 is connected to a reservoir 29, which has a low level open drain 30, and if desired a slow water feed 31.

The purpose of this invention is still met if the regeneration column 2 is placed at a lower level than the ion-exchange column 1. In this case it is possible to obtain the requisite flow through pipe 7 by gravity alone, and so eliminate the expense of the vacuum system. However it is necessary then to provide a continuous air bleed to seal the flow when filling is complete. This is vented via a rising pipe 32 extending above the level of the absorber as shown in FIG. 4. Valves 5, 6 and 26 still perform the same functions as in FIG. 1. The piped connection 7 should include sufficient vertical component as to resist the back flow of liquid under the influence of the air pressure at the regenerator column during normal service.

The method of operating the apparatus of FIG. 4 is as follows:

NORMAL DUTY.

Needle valve 26 is open and there is an air pressure at the top of the regenerator column.

Excess air escapes by way of the valve 6 to atmosphere.
Valve 5 is closed.

TRANSFER FROM REGENERATOR TO ION-EXCHANGE COLUMN.

Valves 6 and 5 are closed while valve 26 is open.
Air pressure pushes resin over into ion-exchange column by way of pipe 3.

TRANSFER FROM ION-EXCHANGE TO REGENERATOR COLUMN.

Valve 26 is closed column.
Valve 5 is open and valve 6 is open.
Excess air in regenerator column vents to atmosphere by way of valve 6 and resin flows from the ion exchange to regenerator column by gravity. When full valve 5 is closed.

The advantage of the above arrangement is that the necessity for sub-atmospheric pressure means is eliminated.

It is to be understood that the above description is by way of example only, the invention being applicable not only to a straight type of regenerator column as illustrated but also to a U-shaped one, while other details for carrying the invention into effect may be varied without departing from the scope of the invention.

I, claim:

1. A continuous ion-exchange apparatus characterized in comprising an open ion-exchange column and a closed regenerator column, means for withdrawing mixed resins from the lower part of the ion-exchange column, a pipe connecting the means for withdrawing the mixed resins to an air cavity at the top of the regenerator column, said pipe connection including sufficient vertical components as to resist the back flow of liquid under influence of air pressure at the top of the regenerator column, a pipe connecting the bottom of the regenerator column to a point above the level of the surface of the liquid in the ion-exchange column, means for varying the relative levels of liquid in the regenerator and the ion-exchange columns by regulating the absolute air pressure above the liquid in the regenerator column, a valve to control the said sub-atmospheric pressure in the cavity, means for providing a super-atmospheric pressure of air in the cavity at the top of the generator column and a valve for controlling the super-atmospheric pressure of the air in the cavity.

2. A continuous ion-exchange apparatus as claimed in claim 1 in which the means for varying the relative levels of liquid in the regenerator and ion-exchange columns includes means for removing water which accompanies the air removed thereby from the cavity.

3. A continuous ion exchange apparatus as claimed in claim 2 in which the means for removing water is an ejector.

4. A continuous ion exchange apparatus as claimed in claim 1 in which the pipe connecting the means for withdrawing the mixed resins from the air cavity and the top of the regenerator column is in the form of an invert trap.

5. A continuous ion exchange apparatus as claimed in Claim 1 in which the connection to the bottom of the regenerator column includes a source of pulsating water under pressure and a piped connection thereto.

6. A continuous ion exchange apparatus as claimed in claim 1 in which there is a plurality of beds in the ion exchange column separated by perforated distributor plates, and the resin is transferred from stage to stage downwards by reversing the flow of liquid through the column.

7. A continuous ion exchange apparatus as claimed in claim 6 in which there is provided an air chamber in the column above or below the lowermost stage and air is supplied under pressure to said air chamber to displace the water during service flow and from which the air is vented rapidly to induce reversal flow in the apparatus when resin transfer is required.

8. A continuous ion exchange apparatus as claimed in claim 1 in which the means for producing a sub-atmospheric pressure in the cavity at the top of the regenerator column is a syphon connected by way of a reservoir.

9. A continuous ion exchange apparatus as claimed in claim 1 in which the means for producing a sub-atmospheric pressure in the cavity at the top of the regenerator column is a pump.

10. A continuous ion exchange apparatus as claimed in claim 1 in which the means for withdrawing mixed resins from the lower part of the ion exchange column is a perforated tube.

11. A continuous ion exchange apparatus as claimed in claim 1 in which the means for producing a sub-atmospheric pressure in the cavity at the top of the regenerator column is a lower level of liquid at the bottom of the regenerator column than at the bottom of the ion exchange column.

12. A continuous ion-exchange apparatus as claimed in claim 1 in which the means for varying the relative levels of the liquid in the regenerator and ion-exchange columns comprises both of said columns wherein the regenerator column is positioned at a lower level than the ion-exchange column so that the resins flow by gravity from the latter to the former, said means for providing a super-atmospheric pressure of air in the cavity at the top of the regenerator column being adapted to effect a transfer of the resins in the reverse direction.

* * * * *